Feb. 25, 1969      M. BITZER ET AL      3,428,994
INTERMITTENT DWELL WINDSHIELD WIPER
Filed Nov. 30, 1967      Sheet 1 of 4

INVENTOR.
MARTIN BITZER
and VITMAR von LANGENDORFF
BY E. Herbert Liss
ATTORNEY.

INVENTOR.
MARTIN BITZER
and VITMAR von LANGENDORFF
BY E. Herbert Liss

ATTORNEY.

United States Patent Office 3,428,994
Patented Feb. 25, 1969

3,428,994
INTERMITTENT DWELL WINDSHIELD WIPER
Martin Bitzer, Kenmore, and Vitmar von Langendorff, Tonawanda, N.Y., assignors to Trico Products Corporation, Buffalo, N.Y.
Filed Nov. 30, 1967, Ser. No. 686,951
U.S. Cl. 15—250.12                  7 Claims
Int. Cl. B60s 1/10; A471 1/02; F01b 25/02

ABSTRACT OF THE DISCLOSURE

A reciprocating air pressure motor includes a pressurized control housing having a pressure differential operated shuttle valve for directing fluid pressure alternately to opposite sides of the piston to move it back and forth; a mechanically operated pilot valve for directing fluid pressure alternately to opposite sides of the shuttle valve; a kicker asembly includes a kicker arm movable with the motor shaft and a valve arm operable to move the pilot valve back and forth, a pressure actuated stop to restrain movement of the kicker arm, a sensing valve on the valve arm for porting fluid to the stop to delay reversal of the pilot valve at a predetermined position of the shaft, thereby initiating a timed dwell period at the end of each cycle of operation; a manual control is provided having (1) an off position for interrupting communication between a pressure source and the control housing, (2) a continuous run position for porting fluid pressure from a source to the pressurized control housing while interrupting application of fluid pressure to the stop and (3) an intermittent dwell position for directing fluid pressure to the pressurized chamber and also through the valve port controlled by the valve arm to the pressure actuated stop in a windshield wiper driven by the output shaft of the motor.

Background of the invention

This invention relates to air pressure windshield wiper motors and, more particularly, to an intermittent dwell air presure type windshield wiper motor.

Windshield wiper systems are known in which a dwell period is provided at the end of each wiper cycle. Wipers of this type are particularly useful in light rain wherein insufficient moisture accumulates during a normal wiping stroke to properly lubricate the wiper blade. With intermittent dwell wipers, moisture accumulates during the dwell period, permitting a smooth clean wipe at an optimum angular speed. Another advantage is the avoidance of fatigue due to the monotony of conventional windshield wipers. Prior art intermittent dwell windshield wipers relied on electrical circuitry or mechanical gearing arrangements for cyclic timing. This invention is an improvement over one of the modifications disclosed in Patent No. 2,987,747, issued June 13, 1961, by J. R. Oishei et al. and assigned to the assignee of the instant invention. There, intermittent dwell systems are shown for positive and negative pressure wiper motors. The present invention provides intermittent dwell wiping especially adaptable for air pressure motors, although it should be understod that this system is applicable to fluid pressure and vacuum motors as well. In the earlier fluid pressure intermittent dwell type, a complex control arrangement utilizing Bowden cables for operating the intermittent dwell sensing valve as well as the parking and continuous run valves were required. These mechanical controls are subject to wear and corrosion. Coordinating the initiation of the dwell period requires a complex mechanism. The present invention provides a positive means of controlling the dwell period in a more simplified and effective arrangement.

Summary

The motor control system of this invention is fully pressure operated through perssurized fluid carrying conduits requiring no moving parts. A unique sensing valve arrangement operating in a fluid circuit with the manual controller automatically times the initiation of the dwell sequence. The duration of the dwell period can be adjusted by the operator by means of the manual controller.

The fluid pressure wiper motor is of a well known type having a reciprocating piston drivingly engaged with a shaft through rack and pinion type gearing for oscillating the shaft; a fluid pressure differential is applied to the opposite sides of the piston by a shaft actuated automatic valve mechanism. A rotary type control valve is provided to control communication between a source of fluid pressure and the motor housing. A kicker assembly associated with the shaft comprises a kicker arm and a valve arm carrying a sensing valve. The valve arm is keyed to the shaft and the kicker arm is pivotally connected to the valve arm with a torsion spring to restrain relative pivotal movement between the kicker arm and the valve arm. The valve arm carries a sensing valve which controls communication between a pressure source through a port and a piston chamber wherein the piston drives a stop pin. When the wiper is set for intermittent operation, fluid is ported to the fluid actuated stop pin. When the kicker assembly reaches a predetermined position adjacent the end of a wiper cycle, the valve arm continues to move with the shaft while the kicker is restrained by the stop pin, thereby preventing reversal of the motor and effecting a dwell period. The stop pin pivot chamber is bled through an adjustable needle valve control on the manual controller and when it is sufficiently vented, the stop pin is spring biased to inoperative position. The kicker is then biased by the torsion spring to complete its motion, reversing the shuttle valve and causing a motor reversal. The action is completed. Mechanical parts between the controller and the motor are eliminated threby facilitating installation. Wear corrosion, initial installation adjustment and subsequent adjustment required in Bowden cable connections are avoided. The manual controller has a continuous run position which interrupts communication between the source of fluid pressure and the stop pin pivot chamber. It also includes a park position which interrupts communication between the fluid pressure source and the motor housing.

The principal object of the present invention is to provide an improved intermittent dwell air pressure motor with improved positive dwell control.

Other objects and advantages of the invention will be apparent from the following detailed description taken in connection with the accompanying drawings.

Description of the preferred embodiments

Figures 1, 2, 3, 4:
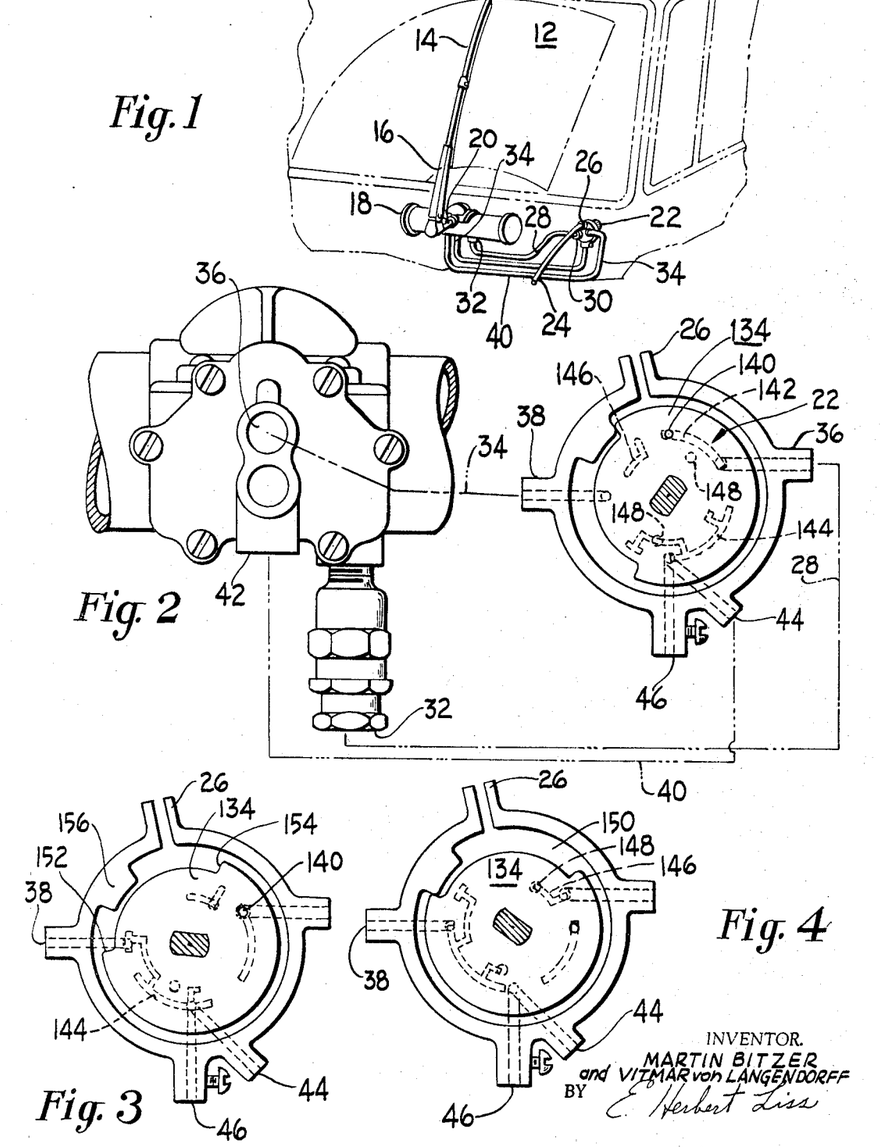
FIG. 1 is a fragmentary view of a motor vehicle having a windshield wiper incorporating the principles of the invention.
FIG. 2 is a diagrammatic view of a windshield wiper system in accordance with the present invention showing the manual controller in continuous run position.
FIG. 3 is a schematic view of the manual controller in the intermittent dwell position.
FIG. 4 is a schematic view similar to FIG. 3 of the manual controller in the park position.

Referring now to the drawings and, more particularly, to FIG. 1, numeral 10 identifies a motor vehicle having a windshield 12 on which is positioned a wiper blade 14 supported by a wiper arm 16 for wiping action thereupon. A wiper motor 18 is positioned for operative support of the wiper arm 16 on a wiper motor oscillating drive shaft 20. A manual control 22 is positioned within the vehicle compartment and may be set by the vehicle operator to achieve the desired type of wiper operation. A harness of flexible tubing is provided including a source conduit 24 extending from a source of fluid pressure (not shown) to an inlet nipple 26 on the manual control 22. A conduit 28 extends from an outlet nipple 30 on the manual control to an inlet port 32 on the motor 18. A conduit 34 extends between sensing port 36 on the motor housing and sensing input nipple 38 on the manual control 22. A conduit 40 extends between an intermittent dwell activating port 42 and a sensing output nipple 44 on the manual control 22.

Looking now at FIGS. 6 to 11, the motor 18 comprises a housing 50 including a piston chamber 52 and a control valve chamber 54. A piston assembly 56, diagrammatically shown in FIGS. 9 to 11, includes a pair of pistons 58a and 58b secured together in spaced relationship by a rack bar 60. In operation the piston assembly reciprocates back and forth along the longitudinal axis of the piston chamber 52. A drive shaft assembly 62 extends transversely through the piston chamber and into the control valve chamber 54. The drive shaft assembly 62 includes the drive shaft 20 having a pinion gear segment 64 secured thereto; the pinion gear segment 64 engages the rack bar 60 to convert the reciprocating motion of the pinion assembly to oscillating motion of the drive shaft 20.

Figure 6:
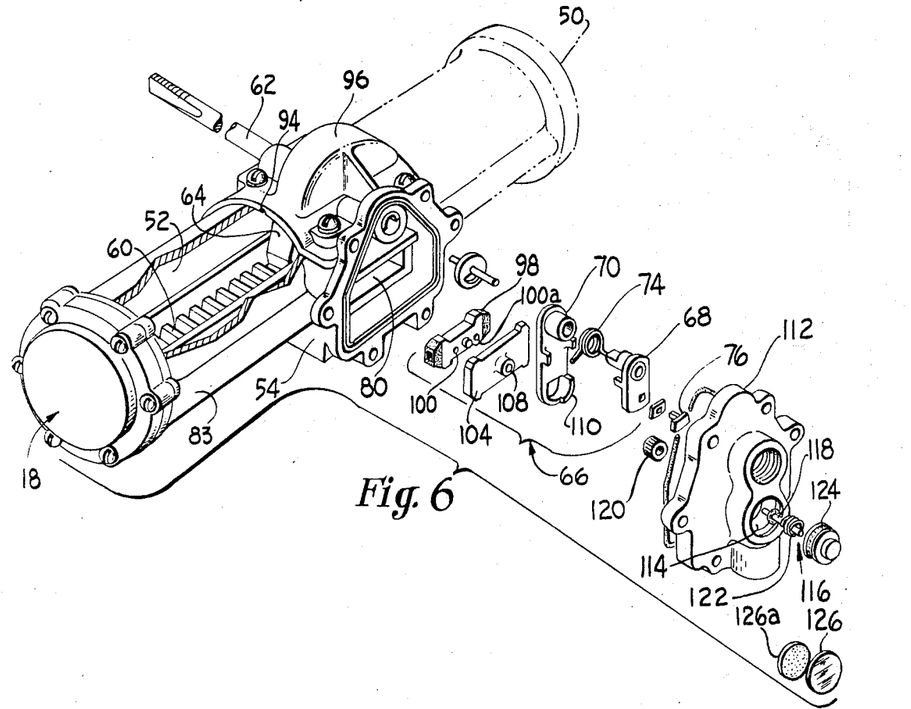
FIG. 6 is an exploded perspective view of the motor.

Operatively secured to the drive shaft 20 is a kicker assembly 66 which includes a valve arm 68 and a kicker arm 70. The valve arm 68 and kicker arm 70 are mounted for pivotal movement on a common axis with the drive shaft 20, the kicker arm 70 being pivotal relative to the valve arm and the drive shaft. The valve arm 68 is keyed to the drive shaft 62 as at 72 for pivotal movement therewith. A torsion spring 74 connecting the valve arm 68 and the kicker arm 70 restrains the kicker arm and valve arm against relative pivotal movement except when a force is applied to overcome the resistance of the torsion spring 74, at which time the valve arm can pivot relative to the kicker arm for a purpose to be hereinafter explained. The valve arm 68 at its free end is operatively connected to a sensing valve 76 which is movable therewith on a valve seat 78 having a sensing port 36 in communication therewith.

A valve seat 80 is formed in control valve chamber 54 and includes a pair of motor chamber ports 82 and 82a, an exhaust port 84 and an exhaust port 86. Each end of the valve seat is formed with a slot 88. The ports 82 and 82a communicate through conduits 83 and 83a with the piston housing 52 at opposite ends of the piston assembly 60, acting during operation of the motor alternately as intake and exhaust ports as will hereinafter be explained. The exhaust port 84 communicates with the atmosphere through a muffler and filter 90. The exhaust port 86 communicates with the atmosphere through a conduit 92, piston chamber 52 and a vent opening 94 in the cover 96 of control valve chamber 54. Seated on the valve seat 80 is a fluid pressure differential actuated shuttle valve 98 having passages 100 and 100a extending therethrough. The shuttle valve 98 also includes an inverted U-shaped recess 102 on the side facing the valve seat 80 having its web in alignment with exhaust port 84 and its legs in alignment with ports 82 and 82a of the valve seat 80. A pilot valve 104 overlies shuttle valve 98 and is movable independently thereof. The pilot valve 104 includes a longitudinal slot 106 which is of a length smaller than the distance between recesses 88 and the valve seat. The longitudinal axis of slot 106 intersects the recesses 88 and is in alignment with exhaust port 86. A projection 108 extends outwardly from the pilot valve 104 and is engageable with the free end of the kicker arm 70. As the kicker arm oscillates with the shaft, it moves the pilot valve back and forth. A lost motion engagement between the kicker arm 70 and the projection 108 of the pilot valve 104 permits the pilot valve 104 to move linearly on valve seat 80. The free end of the kicker arm includes a lug 110 for a purpose to be hereinafter explained.

Figure 7:
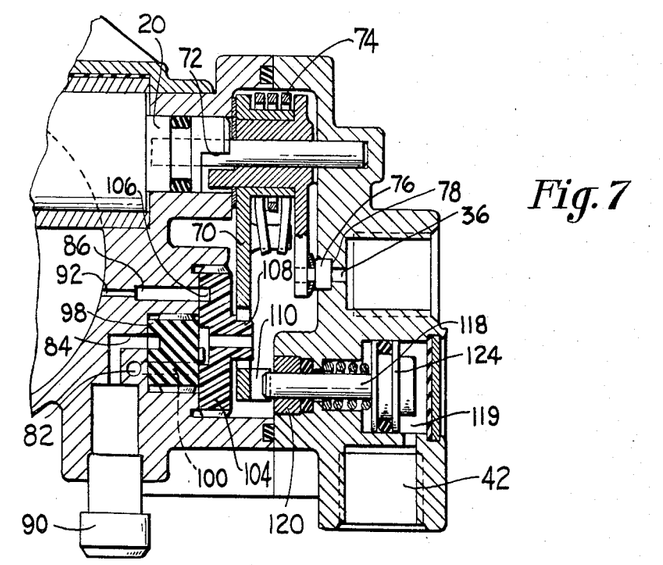
FIG. 7 is a sectional view of the valve chamber showing the stop pin in operative position.
Figure 8:
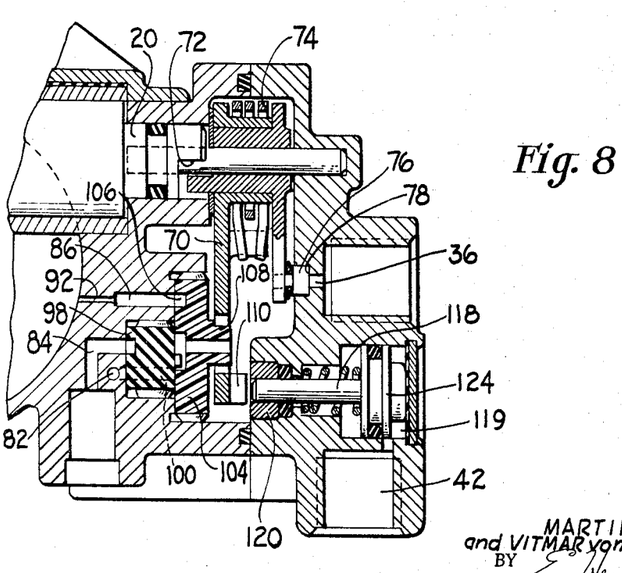
FIG. 8 is a view similar to FIG. 7 showing the stop pin in retracted position.
Figure 9:
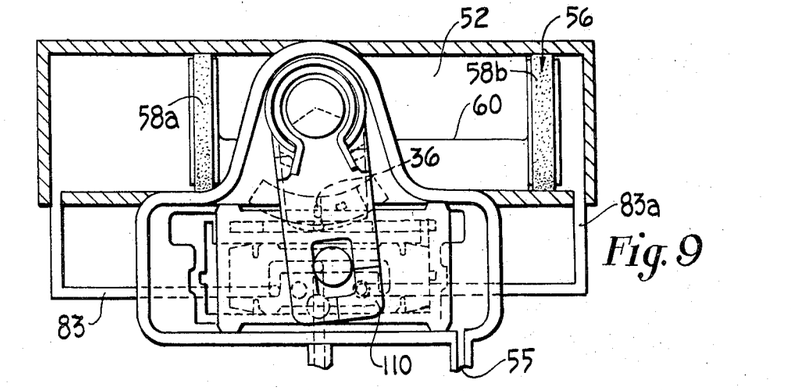
FIGS. 9, 10 and 11 are schematic sectional views of the motor showing the kicker and valve assembly in various stages of operation.
Figure 10:
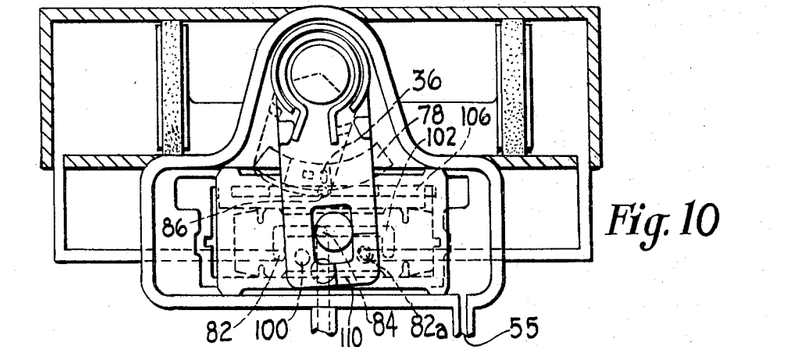

The control valve chamber 54 includes a cover assembly 112 having an opening 114 therethrough for receiving a pressure operated stop mechanism assembly 116 which may constitute a time delay mechanism for the kicker arm as will be hereinafter explained. The stop mechanism assembly 116 includes a stop pin 118 slidable in a bearing 120 disposed in the opening 114. A coil spring 122 is interposed between an outwardly facing shoulder in the opening 114 and a piston 124 secured at the outer end of the pin 118. An enlarged diameter portion of the opening 114 forms a cylinder or piston chamber 119 in which the piston 124 is reciprocable. A cover 126 and cover seal 126a form a closure for the piston chamber 119. Activating port 42 communicates with piston chamber 119.

Figure 5:
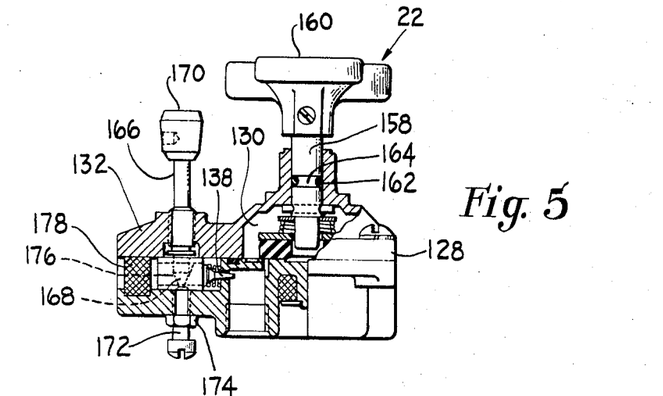
FIG. 5 is a partial sectional view of the manual controller utilized in this invention.

Manual controller 22 includes a housing 128 having a valve chamber 130 and a bleed chamber 132. A disc valve 134 has a number of interconnecting passages for controlling flow of air through the manual controller 22 from a source to the motor. The valve chamber includes an inlet port and nipple 26, an outlet port and nipple 30, a sensing input port and nipple 38, a sensing output port and nipple 44 and a sensing bleed port 46 communicating with the bleed chamber 132 through a check valve 138. The rotatable disc valve 134 includes an opening 140 therethrough communicating with an arcuate passage 142. A substantially arcuate passage 144 is provided in the disc valve which has a plurality of intersecting subpassages. A third passage 146 is also provided in the face of the disc valve. A pair of atmospheric bleed openings 148 are provided in the valve seat 150 on which the disc valve operates. The disc valve 134 includes a pair of circumferentially spaced opposed shoulders 152 and 154 which are engageable with opposite sides of lug 156 formed in the valve chamber 130 to limit rotary movement of the disc valve 134. The disc valve is operatively connected to shaft 158 for rotation therewith. Shaft 158 extends outwardly from the valve chamber 130 and has a knob 160 secured thereto in any suitable manner as, for example, by a set screw as shown. The opening through the housing for the extension of shaft 158 is sealed by an O-ring 162 received in an annular recess 164 on the shaft 158. The bleed chamber 132 has a pair of aligned openings on opposite sides thereof. In one opening there is threadably received a shaft 166 having a needle valve 168 formed at the inner end thereof. A knob 170 is secured to the outer end of the shaft 166. Through the opposite aligned opening is a stop screw 172 threadably received therein having a lock nut 174 to secure the screw 172 in proper adjusted relationship. The needle valve 168 seats in a conical valve seat 176 to control the bleed rate through atmospheric vent 178.

Operation

Assume that the manual control is in the off position shown in FIG. 4 and the motor is dormant; it is now desired to start continuous motor operation. By means of the knob 160 and shaft 158, the disc is rotated to the position shown in FIG. 2. The manual controller is pressurized from a source (not shown) through conduit 24 and inlet port 26. Pressure is then communicated to the control valve chamber 54 through opening 140 of the manual control, disc valve 134, recess 142, outlet port 30, conduit 28 and inlet port 32 of the control valve chamber 54 through passage 55. In the dormant state, the motor would be in the position shown in FIG. 11. Port 100 would be in alignment with port 82 and pressure would be communicated through port 100, port 82, passage 83 to the piston chamber 52 at the outer side of piston 58a. The outer side of piston chamber 58b of piston chamber 52 would communicate through passage 83a, port 82a, U-shaped recess 102, exhaust port 84 and muffler 90 to the atmosphere. The pressure differential on opposite sides of piston assembly 56 would drive the piston assembly to the right from the position viewed in FIG. 11, moving the kicker assembly 66 in a counterclockwise direction thereby carrying the pilot valve 104 to the right from the position viewed in FIG. 11. The longitudinal slot 106 in pilot valve 104 would effect communication between slot 88 on the right hand side of shuttle valve 98 and the exhaust port 86 through conduit 92 to vent opening 94, creating a pressure differential on opposite sides of shuttle valve 98. Shuttle valve 98 would therefore move to the right from the position seen in FIG. 11. The motor 18 and its valving would then be in the condition shown in FIG. 9. Opening 100a and shuttle valve 98 would be in alignment with port 82a in the valve seat, thus effecting communication with the air pressure source through passage 83a to the outer side of piston 58b in piston chamber 52. Opening 82a of the valve housing would then be in communication with exhaust port 86 and the valve seat through U-shaped recess 102 in shuttle valve 98, thus venting the outer side of piston 58a of piston chamber 52 through passage 83, port 82, U-shaped recess 102, exhaust port 84 and muffler 90, thus driving piston assembly 56 to the right and kicker assembly 66 in a clockwise direction back to the position shown in FIG. 11. This operation would be repeated so long as the manual control is in the position shown in FIG. 2, thereby oscillating the drive shaft 20, the wiper blade 14 and wiper arm 16.

Assume now that it is desired to operate the wipers intermittently with a dwell period at the end of each cycle. The manual control is moved to the position shown in FIG. 3. The manual control 22 is pressurized as in the run position and the control valve chamber 54 is pressurized through port 140 and conduit 28 as in the run position. Recess 144 now connects sensing input port 38 with sensing output port 44 and sensing bleed port 46. The running operation is the same as hereinabove described for the continuous run position. However, now when the sensing valve 76 moves to a position wherein sensing port 36 is open, as in FIG. 9, a pulse of compressed air is transmitted through sensing port 36, conduit 34, sensing input port 38 in manual control 22, recess 144, sensing output port 44, conduit 40 and sensing activating port 42 to stop pin piston housing 119. The stop pin piston 124 is thereby driven to the position shown in FIG. 7 with the stop pin projecting into the path of lug 110 on kicker arm 70. This restrains the kicker arm 70 during its clockwise movement. Because of the torsion spring connection between the valve arm 68 and the kicker arm 70, the valve arm continues its clockwise motion while the kicker arm is restrained, resulting in the condition seen in FIG. 10. The sensing valve port 36 is closed by the sensing valve 76 removing application of pressure to piston 124. The sensing piston chamber 119 then vents through sensing activating port 42, conduit 40, port 44, recess 144, sensing bleed port 46, check valve 138, needle valve seat 176 and vent port 178. The rate at which the sensing piston chamber vents is controlled by the position of the needle valve 168 and this controls the duration of the dwell period. When the piston chamber 119 is vented, the piston 124 is spring biased to a retracted position, thereby retracting the stop pin 118. The torsion spring 74 snaps the kicker arm clockwise into alignment with the valve arm 68 and initiates a reversal of the motor piston assembly 56, permitting another cycle of operation at the end of which a second dwell period occurs. This continues repeatedly so long as the manual control is in the position shown in FIG. 3.

If it is desired to park the wipers, the manual controller is turned to the position shown in FIG. 4 with a shoulder 152 against the lug 156 during a dwell period. The input port 26 is closed interrupting communication with the source of fluid pressure. The output port 30 is connected through slot 144 with vent 148 and the sensing input port is connected through slot 144 with the other vent 148. The sensing output port 44 is closed. Thus, no pressure is applied through the controller to the motor. The entire motor is vented through the manual control 22 to place it in a dormant condition while the wipers are in a parked position.

It should now be apparent that an improved air pressure wiper system has been provided for producing either continuous wiper cycling or intermittent dwell operation in which the dwell period can be varied. This system is capable of controlling the wiper operation without the use of mechanical media between the control and the wiper motor, thereby enhancing the durability and simplifying the system. A specific embodiment of the invention has been described for the purpose of illustration, but it will be apparent that various modifications and other embodiments are possible within the scope of the invention. It is to be understood therefore that the invention is not limited to the specific arrangement shown, but in its broadest aspects it includes all equivalent embodiments and modifications which come within the scope of the invention.

What is claimed is:

1. A pressure operated windshield wiper system for motor vehicles including a wiper motor comprising a housing, a piston chamber in said housing having a piston drivingly connected to a wiper actuating shaft for oscillating said shaft, a pressure responsive shuttle valve having fluid distributing passages for applying pressure alternately to opposite ends of the piston chamber to move the piston back and forth, a shiftable pilot valve for controlling application of pressure to the shuttle valve to so shift it for directing pressure fluid into and out of the piston chamber; characterized by a kicker assembly comprising a kicker arm operated by the shaft to shift the pilot valve, fluid pressure actuated stop means for periodically restraining movement of said kicker arm in a selected position, port means for effecting communication between a source of fluid pressure and said pressure actuated stop means, sensing valve means for closing said port means when said kicker arm is in said selected position, bleed means for timed venting of said stop means when said port means is closed, means for operatively connecting said kicker arm to said sensing valve means for movement therewith, but permitting independent movement of said sensing valve when said stop means is in position to restrain movement of said kicker arm whereby reversal of said motor is delayed, thereby effecting a dwell period during each cycle of wiper operation.

2. A windshield wiper system according to claim 1 wherein said bleed means is adjustable to thereby vary the duration of the dwell period.

3. A windshield wiper system according to claim 1 which includes a manual controller movable to a plurality of operating positions having means for interrupting communication between said port means and said source of fluid pressure in one operating position to thereby effect continuous operation of said wiper motor.

4. A windshield wiper system according to claim 3 wherein said bleed means is located at said manual controller.

5. A windshield wiper system according to claim 3 wherein said manual controller is positioned remotely from said wiper motor.

6. A windshield wiper system according to claim 4 wherein said bleed means at said controller is adjustable to thereby vary the duration of the dwell period.

7. A windshield wiper system according to claim 4 wherein said manual controller includes means for controlling communication between said wiper motor and said source of fluid pressure.

References Cited

UNITED STATES PATENTS

| 2,395,969 | 3/1946 | Kaser | 91—322 XR |
| 2,987,747 | 6/1961 | Oishei et al. | 15—250.16 |
| 3,301,137 | 1/1967 | D'Alba et al. | 91—219 |

PETER FELDMAN, *Primary Examiner.*

U.S. Cl. X.R.

15—250.16; 91—7, 219, 322

UNITED STATES PATENT OFFICE
CERTIFICATE OF CORRECTION

Patent No. 3,428,994          Dated February 25, 1969

Inventor(s) Martin Bitzer and Vitmar Von Langendorff

It is certified that error appears in the above-identified patent and that said Letters Patent are hereby corrected as shown below:

In the drawings: Sheet 1, Figure 1, the reference numeral 34 appearing in the central portion of the figure should be omitted Figure 2, reference numeral 36 applied to the outlet nipple of the manual control 22 should be 30.

Sheet 1, Figures 2, 3 and 4, reference numeral 46a should be applied to the adjusting screw at the exhaust nipple 46; reference numeral 138a should be applied to the port between the sensing output port 44 and the exhaust port 46;

Sheet 2, Figure 5, reference numeral 178 should be 46; reference numeral 172 should be 46a, reference numeral 138a should be applied to the bleed port controlled by needle valve 138; reference numeral 44 should be applied to the sensing output port which communicates with exhaust port 46 through bleed port 138;

Sheet 2, Figure 6, reference numeral 107 should be applied to the opening adjacent stop lug 110 at the lower end of the kicker arm 70; reference numeral 109 should be applied to the opening through projection 108 on pilot valve 104; reference numeral 36 should be applied to the sensing port shown above chamber 114 in cover assembly 112;

Sheet 3, Figures 7 and 8, reference numeral 68 should be applied to the valve arm which carries sensing valve 76; reference numeral 82 should be 83a; reference numeral 100 should be 100a; reference numeral 109 should be applied to the port through projection 108 of pilot valve 104; reference numeral 109a should be applied to the recess at the terminal of port 109.

Sheet 1

UNITED STATES PATENT OFFICE
CERTIFICATE OF CORRECTION

Patent No. 3,428,994                Dated February 25, 1969

Inventor(s) Martin Bitzer and Vitmar Von Langendorff

Figure 11:
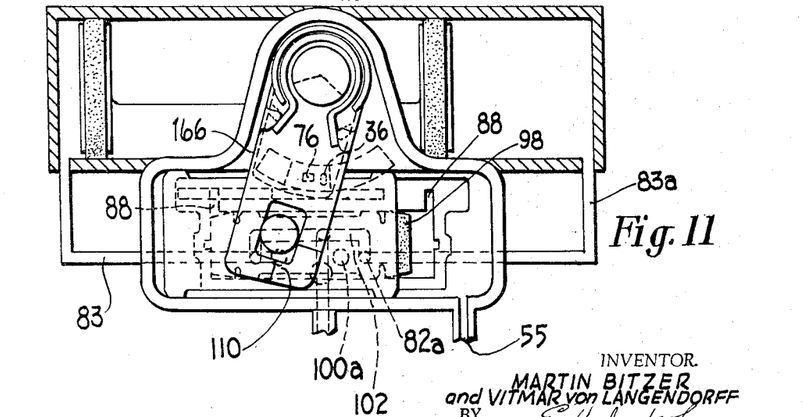

It is certified that error appears in the above-identified patent and that said Letters Patent are hereby corrected as shown below:

Sheet 4, Figure 11 should appear as follows:

Fig. 11

Column 1, line 19, "asembly" should be --assembly--; line 42, "presure" should be --pressure--; line 61, "understod" should be --understood--. Column 2, line 39, "threby" should be --thereby--. Column 3, line 25, please add --A bleed port 46 is shown controlled by screw 46a.--. Column 4, line 5, "and" should be --in--; line 9, "with the" should be --with an opening 107 adjacent the--; line 13, after "80." insert --The valve chamber 80 is pressurized through a port 109 in pilot valve 104 terminating in a recess 109a on the underside of pilot valve 104.--; line 36, "port and nipple" (both occurrences) should be --port at nipple--; line 37, "and" should be --at--; line 38, "and nipple" should be --at Sheet 2

UNITED STATES PATENT OFFICE
CERTIFICATE OF CORRECTION

Patent No. 3,428,994          Dated February 25, 1969

Inventor(s) Martin Bitzer and Vitmar Von Langendorff

It is certified that error appears in the above-identified patent and that said Letters Patent are hereby corrected as shown below:

nipple--; "a sensing bleed" should be --an exhaust--; line 39, "check valve 138." should be --a bleed port 138a controlled by a needle valve 138. The exhaust port shown diagrammatically at 46, 46a in Figures 2 to 4 in fact takes the form of a connection from the port 44 through port 138a to the bleed chamber 132.--; line 60, "needle valve" should be --cam surface--; line 63, "172" should be --46a--; line 65, "172" should be --46a--; "needle" should be --cam--; line 66, "valve" should be --surface--; "seats in" should be --drives--; line 66, "conical valve seat" should be --cam--; line 67, "the bleed" should be --the needle valve 138 which controls the bleed--; line 67, "178" should be --46--. Column 5, line 10, "through port" should be --through opening 109 and recess 109a in projection 108 of pilot valve 104 thence throu port--; line 12, "outer side of piston chamber 58b" should be --section of--; line 13, delete "of"; "52 would" should be --52 at the outer side of piston 58b would--; line 51, "sensing bleed port 46" should be --exhaust port 46 through bleed port 138a.--; line 71, "sensing bleed port 46, check valve 138, needle" should be --bleed port 138a, and--; line 72, "valve seat 176 and vent po 178" should be --exhaust 46.--; line 74, "168 and this" should be --138, controlled by the position cam 176 which in turn--. Column 6, line 12, "The input" should be --The--; line 13, "26" should be --140--; line 13, delete "with the"; line 14, "source o fluid pressure," should be --between the inlet 26 of control 22 and the outlet 146.--; line 15, "144" should be --146--; line 17, "closed" should be --vented through exhaust 44 and bleed port 138a--; line 20, "it" should be --the motor--.

Sheet 3

Signed and sealed this 19th day of October 1971.

(SEAL)
Attest:

EDWARD M. FLETCHER, JR.
Attesting Officer

ROBERT GOTTSCHALK
Acting Commissioner of Patents